US011144146B2

(12) United States Patent
Seo et al.

(10) Patent No.: US 11,144,146 B2
(45) Date of Patent: Oct. 12, 2021

(54) FLAT PANEL DISPLAY HAVING IN-CELL TYPE TOUCH SENSOR

(71) Applicant: Samsung Display Co., Ltd., Yongin-Si (KR)

(72) Inventors: Yun Min Seo, Hwaseong-si (KR); Bum Lee, Seoul (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/858,901

(22) Filed: Apr. 27, 2020

(65) Prior Publication Data
US 2021/0026476 A1    Jan. 28, 2021

(30) Foreign Application Priority Data

Jul. 24, 2019 (KR) .................. 10-2019-0089854

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05)

(58) Field of Classification Search
CPC ......... G06F 3/41; G06F 3/0412; G06F 3/0446
USPC ................................................ 345/173, 174
See application file for complete search history.

(56) References Cited

U.S. PATENT DOCUMENTS

| 8,780,078 | B2 * | 7/2014 | Kim | ...................... | G06F 3/0443 345/174 |
| 9,470,941 | B2 * | 10/2016 | Park | ...................... | G06F 3/0445 |
| 2006/0238696 | A1 * | 10/2006 | Wen | ...................... | C09K 19/56 349/187 |
| 2016/0074704 | A1 * | 9/2016 | Kim | ...................... | G06F 3/041 345/174 |

FOREIGN PATENT DOCUMENTS

| KR | 10-2014-0097816 A | 8/2014 |
| KR | 10-2016-0093442 A | 8/2016 |
| KR | 10-1681806 B1 | 12/2016 |
| KR | 10-2017-0054844 A | 5/2017 |
| KR | 10-2017-0081098 A | 7/2017 |
| KR | 10-2018-0036367 A | 4/2018 |

\* cited by examiner

*Primary Examiner* — Calvin C Ma
(74) *Attorney, Agent, or Firm* — Innovation Counsel LLP (57) ABSTRACT

An exemplary embodiment provides a flat panel display including: a first display panel and a second display panel facing each other; a display element disposed between the first display panel and the second display panel; a common electrode configured to transfer a common voltage and including a plurality of common electrode pads; a light blocking member; and a plurality of sensing wires connected to the common electrode to transfer a sensing signal, wherein the sensing wires overlap the light blocking member.

19 Claims, 7 Drawing Sheets

FLAT PANEL DISPLAY HAVING IN-CELL TYPE TOUCH SENSOR

CROSS-REFERENCE TO RELATED APPLICATION

This application claims priority to and benefits of Korean Patent Application No. 10-2019-0089854 filed in the Korean Intellectual Property Office on Jul. 24, 2019, the entire contents of which are incorporated herein by reference.

BACKGROUND

1. Field

The present disclosure relates to a flat panel display including an in-cell touch sensor.

2. Description of the Related Art

A flat panel display is one of display devices that are most widely used at present, and includes display elements which includes a liquid crystal layer, an organic light emitting layer and etc. The flat panel display includes a field generating electrode for controlling amount of light pass through or generated in the display elements, and a plurality of signal lines for applying a voltage to the field generating electrode. When a voltage is applied to the electric field generating electrode, amount of light emitted from the flat panel display is altered, and accordingly, an image can be displayed by adjusting an amount of transmitted light.

The field generating electrode includes a pixel electrode to which a data voltage is applied and a common electrode to which a common voltage is applied. The pixel electrode may receive a data voltage through a switching element such as a transistor.

In addition, a touch type of display device capable of inputting a user's command by selecting a screen of the flat panel display with a human hand or an object is widely used.

Such a touch sensing function may be implemented by a touch sensor. The touch sensor may be classified according to various touch sensing methods such as a resistive type, a capacitive type, an electromagnetic resonance type (EMR), and an optical type.

In particular, the capacitive touch sensor may include a sensing capacitor including a touch electrode capable of transferring a sensing signal, and may detect a change in capacitance of a sensing capacitor generated when a conductor such as a finger approaches the sensor, to determine whether contact is made and the contact position The above information disclosed in this Background section is only for enhancement of understanding of the background of the described technology and therefore it may contain information that does not form the prior art that is already known in this country to a person of ordinary skill in the art.

SUMMARY

Exemplary embodiments have been made in an effort to provide a flat panel display including an in-cell touch sensor, and which has a thin thickness, a simplified manufacturing process, and improved transmittance by including a common electrode capable of touch sensing without a separate touch electrode layer.

An exemplary embodiment provides a flat panel display including: a first display panel and a second display panel facing each other; a display element disposed between the first display panel and the second display panel; a common electrode configured to transfer a common voltage and including a plurality of common electrode pads; a light blocking member; and a plurality of sensing wires connected to the common electrode to transfer a sensing signal, wherein the sensing wires overlap the light blocking member.

The first display panel may include a first substrate, a gate line extending in a first direction, a thin film transistor, and a pixel electrode, and the light blocking member and the sensing wires may extend in the first direction.

The second display panel may further include a second substrate and an insulating layer on the second substrate, the insulating layer may be disposed between the plurality of sensing wires and the plurality of common electrode pads, and the common electrode pads may be connected to the sensing wires through an opening of the insulating layer exposing the sensing wires.

Each of the common electrode pads may be connected to at least one of the sensing wires.

The light blocking member may overlap the thin film transistor.

The common electrode pads may be arranged in a matrix form, and each of the common electrode pads may be connected to different sensing wires among the plurality of sensing wires.

The common electrode pads may be spaced apart from each other.

The common electrode pads may be disposed in a same layer.

The flat panel display according to the exemplary embodiment may further include a touch driver, and the touch driver may be connected to each of the common electrode pads.

The display elements include liquid crystal molecules having negative dielectric anisotropy.

The pixel electrode may include a first subpixel electrode and a second subpixel electrode, and the thin film transistor may be disposed between the first subpixel electrode and the second subpixel electrode.

The sensing wires may extend in the first direction between the first subpixel electrode and the second subpixel electrode.

The thin film transistor may include a gate electrode extending from the gate line, a semiconductor layer, a source electrode, and a drain electrode.

An exemplary embodiment provides a flat panel display including: a first substrate; a gate line disposed on the first substrate to extend in a first direction; a second substrate facing the first substrate; a light blocking member disposed on the second substrate; a sensing wire extending in the first direction and disposed on the light blocking member to transfer a sensing signal; an insulating layer disposed on the light blocking member and the sensing wire to include an opening exposing the sensing wire; and a common electrode disposed on the insulating layer to transfer a common voltage, wherein the sensing wire is connected to the common electrode in the opening of the insulating layer, and the opening overlaps the light blocking member.

The light blocking member may extend in the first direction.

The flat panel display according to the exemplary embodiment may further include a thin film transistor and a pixel electrode disposed on the first substrate, and the light blocking member may overlap the thin film transistor.

The common electrode may include a first common electrode pad and a second common electrode pad that are adjacent in the first direction, the sensing wire may include a first sensing wire that is connected to the first common electrode pad and a second sensing wire that is connected to the second common electrode pad, and the first common electrode pad may overlap the first sensing wire and the second sensing wire.

The common electrode may further include a third common electrode pad that is adjacent to the first common electrode pad in a second direction crossing the first direction, the sensing wire may further include a third sensing wire that is connected to the third common electrode pad, and the third common electrode pad may not overlap the first sensing wire and the second sensing wire.

The first common electrode pad, the second common electrode pad, and the third common electrode pad may be disposed on a same layer and spaced apart from each other.

The flat panel display according to the exemplary embodiment may further include a liquid crystal layer disposed between the pixel electrode and the common electrode, and the liquid crystal layer may include liquid crystal molecules having negative dielectric anisotropy.

According to the exemplary embodiments, the thickness of the display device may be reduced by not forming a touch electrode layer separately, and the manufacturing process may be simplified. In addition, the transmittance of the flat panel display may be improved.

DETAILED DESCRIPTION

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

To clearly describe the present inventive concept, parts that are irrelevant to the description are omitted, and like numerals refer to like or similar constituent elements throughout the specification.

Further, since sizes and thicknesses of constituent elements shown in the accompanying drawings are arbitrarily given for better understanding and ease of description, the present inventive concept is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, the word "over" or "on" means positioning on or below the object portion, and does not necessarily mean positioning on the upper side of the object portion based on a gravity direction.

In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above, and the phrase "in a cross-sectional view" means when a cross-section taken by vertically cutting an object portion is viewed from the side.

Figure 1:
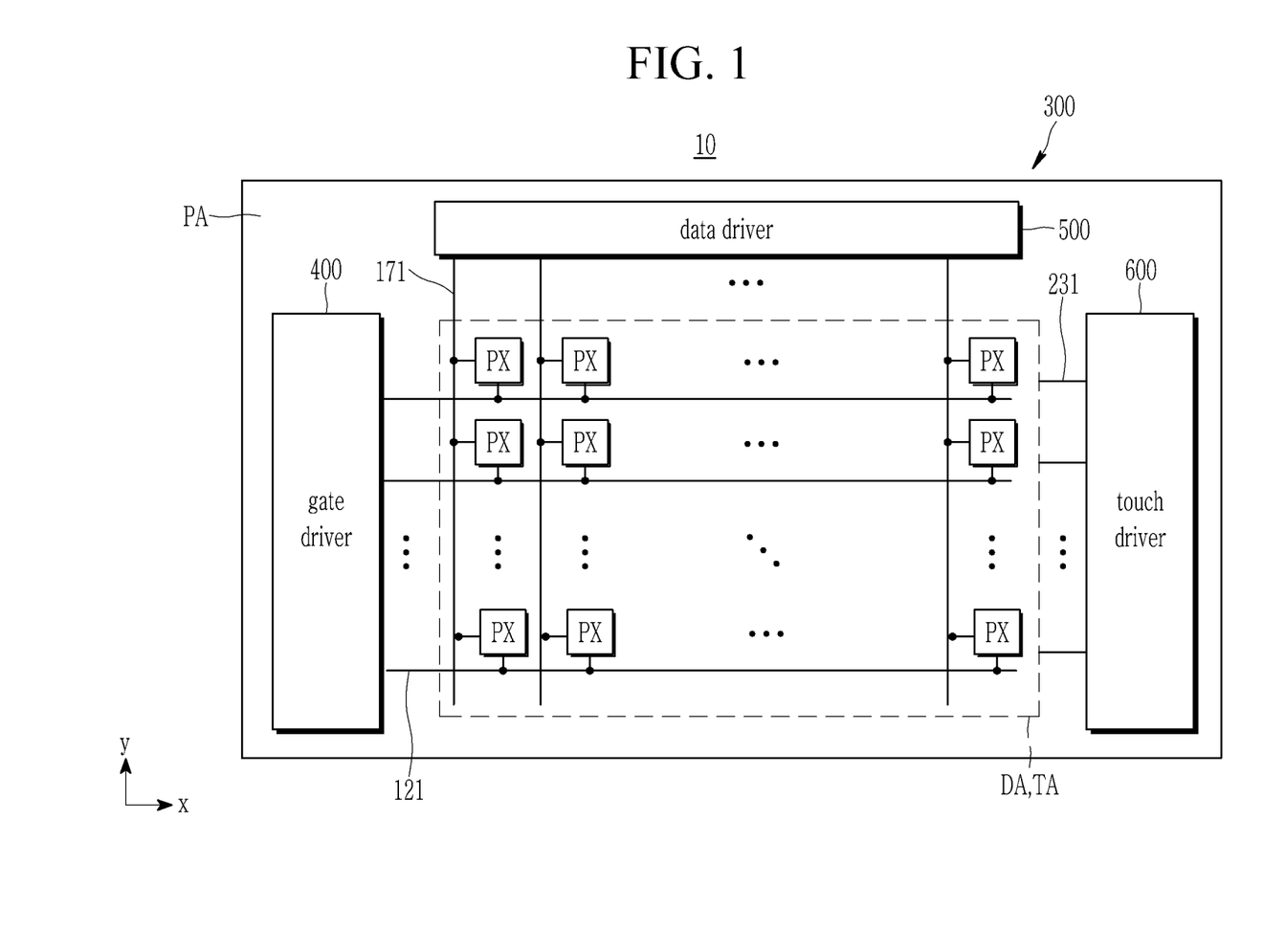
FIG. 1 illustrates a block diagram of a flat panel display according to an exemplary embodiment.

Hereinafter, a flat panel display according to an exemplary embodiment will be described. FIG. 1 illustrates a block diagram of a flat panel display according to an exemplary embodiment.

Referring to FIG. 1, the flat panel display 10 includes a display panel 300 including a display area DA, a touch area TA, and a peripheral area PA.

The display area DA of the display panel 300 serves to display an image. A plurality of gate lines 121, a plurality of data lines 171, and a plurality of pixels PX connected to the gate lines 121 and the data lines 171 are disposed in the display area DA. The gate lines 121 extend in a first direction x and transmit a gate signal. The data lines 171 extend in a second direction y to transfer a data voltage. Each of the pixels PX is a minimum unit for displaying a color of an image, and the display device displays an image through the pixels PX. Each pixel PX may include a switching element and a pixel electrode connected to one gate line 121 and one data line 171. The switching element may be a three-terminal element such as a thin film transistor integrated in the display panel 300.

The touch area TA of the display panel 300 is an area capable of detecting contact or movement when an object moves in a close or approaching state as well as when the object directly contacts the touch area TA. The touch area TA may overlap the display area DA. In FIG. 1, the touch area TA is illustrated as coinciding with the display area DA, but the touch area TA is not limited thereto, and the touch area TA may not coincide with the display area DA.

The peripheral area PA is positioned in a circumference region of the display area DA or the touch area TA, and elements or wires for generating or transferring various signals to be applied to the display area DA or the touch area TA are disposed in the peripheral area PA.

A gate driver 400 is integrated in the peripheral area PA of the display panel 300 to sequentially transfer gate signals to a plurality of gate lines 121. Each of the gate signals may include a gate-on voltage Von and a gate-off voltage Voff. The gate driver 400 may receive a scan start signal for indicating start of output of a gate-on pulse, a gate clock signal for controlling output timing of the gate-on pulse, and the like in order to sequentially drive the gate lines 121. Signal lines (not illustrated) for applying these signals to the gate driver 400 may be disposed in the peripheral area PA of the display panel 300.

A data driver 500 is connected to the data lines 171 to transfer a data voltage. The data driver 500 may be directly mounted in the peripheral area PA of the display panel 300, or may be integrated in the peripheral area PA in the same manufacturing process as that of the switching element disposed in the display area DA. Alternatively, unlike as illustrated in FIG. 1, the data driver 500 may be positioned on a flexible printed circuit film that is attached to the display panel 300.

A touch driver 600 is disposed in the peripheral area PA outside the touch area TA, and is connected to a common electrode pad Cp (see FIG. 2) to be described later through a sensing wire 231 to transfer a sensing input signal to the common electrode pad Cp and to receive a sensing output signal. The touch driver 600 may process the sensing output signal to generate contact information such as an existence of contact and a contact position. The touch driver 600 may be disposed on a printed circuit board that is separate from the display panel 300 to be connected to the display panel 300, may be attached to the display panel 300 in a form of an integrated circuit chip or TCP, or may be integrated on the display panel 300.

According to the present exemplary embodiment, the flat panel display 10 may include the gate driver 400, the data driver 500, the touch driver 600, and a plurality of electrical elements such as a plurality of thin film transistors, a plurality of capacitors, and a plurality of diodes as various electrical constituent elements.

Figure 2:
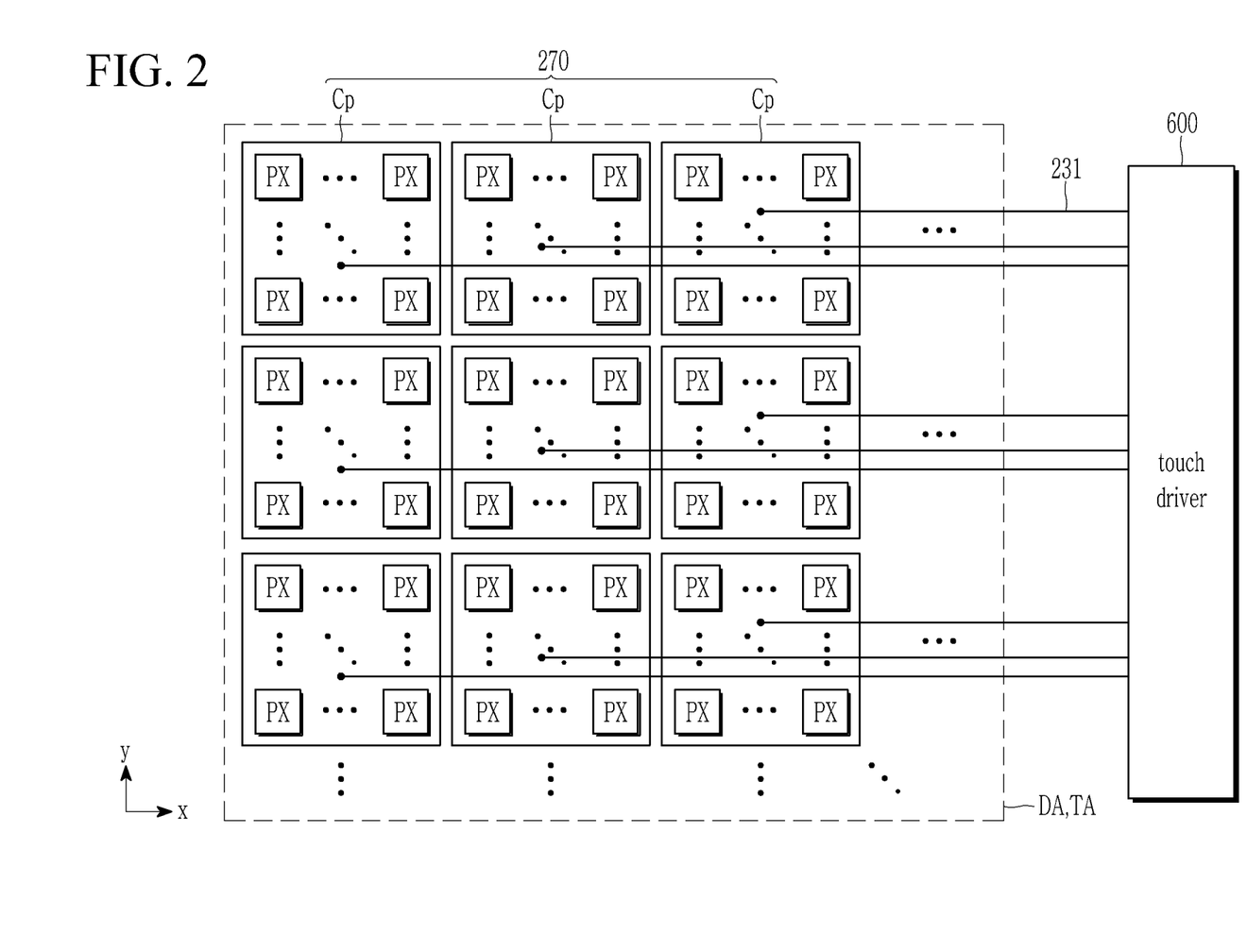
FIG. 2 illustrates a top plan view of a flat panel display according to an exemplary embodiment.
Figure 3:
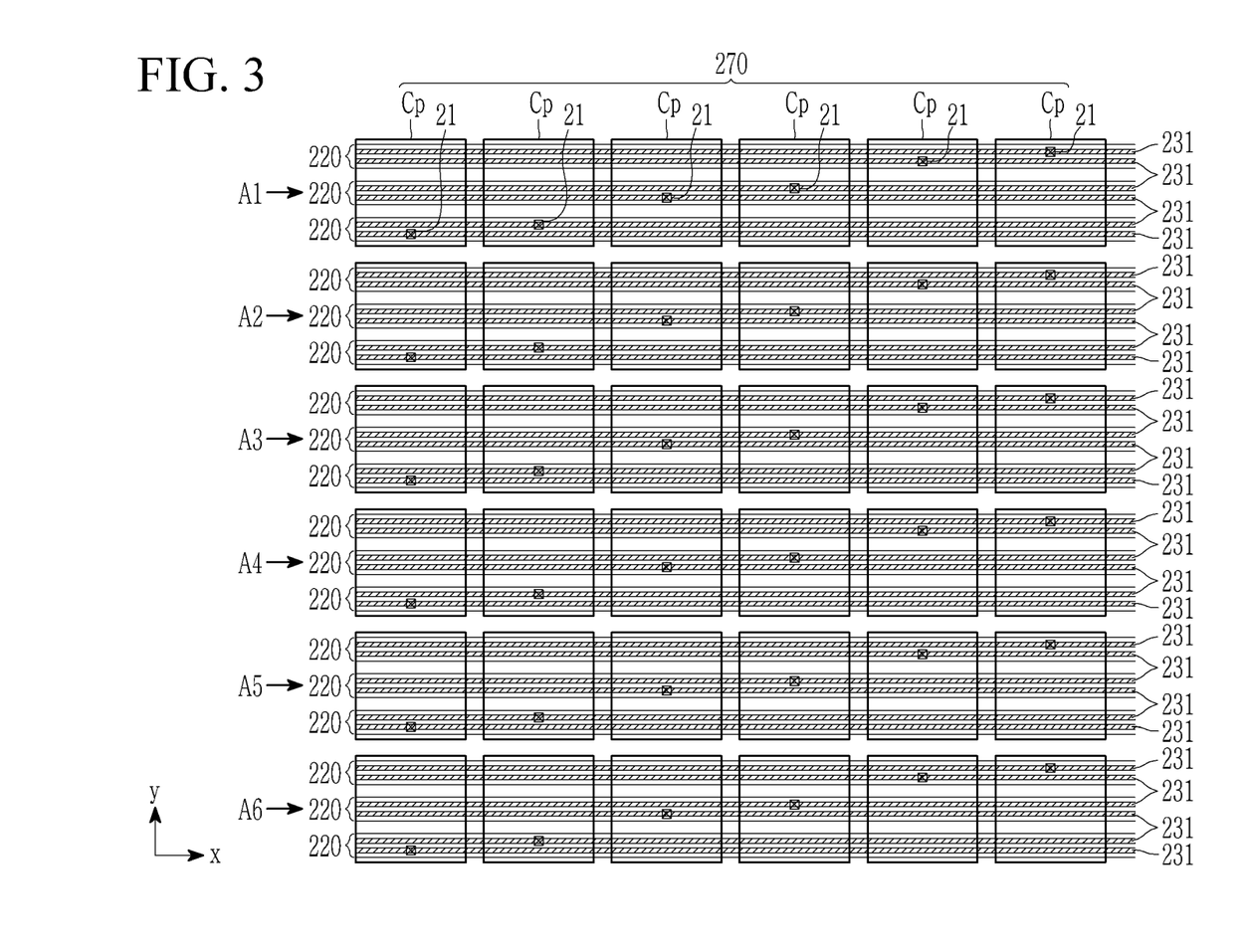
FIG. 3 illustrates a top plan view showing a common electrode and a sensing wire of a flat panel display according to an exemplary embodiment.

Hereinafter, the flat panel display 10 according to the present exemplary embodiment will be described with reference to FIG. 2 and FIG. 3. FIG. 2 illustrates a top plan view of a flat panel display according to an exemplary embodiment. FIG. 3 illustrates a top plan view showing a common electrode and a sensing wire of a flat panel display according to an exemplary embodiment.

Referring to FIG. 2 and FIG. 3, a common electrode 270 receiving a common voltage is divided into a plurality of common electrode pads Cp which are isolated to form a self-sensing capacitor. The plurality of common electrode pads Cp may be touch sensing units and may receive a common voltage. The plurality of common electrode pads Cp may be separated from each other and arranged in a matrix configuration. Each of the common electrode pads Cp may overlap the plurality of pixels PX in a plan view. The pixel PX may be a minimum unit for displaying a color of an image and may include a thin film transistor serving as a switching element and a capacitor.

The plurality of common electrode pads Cp may be disposed on a same layer as each other in a cross-sectional structure. The plurality of common electrode pads Cp may include a transparent conductive material such as indium tin oxide (ITO) or indium zinc oxide (IZO), and metal nanowires. Shapes of the common electrode pads Cp may be rectangular as illustrated in FIG. 2 and FIG. 3, but they are not limited thereto and may have various shapes.

Each common electrode pad Cp forms a self-sensing capacitor together with a touch object such as a finger to receive a sensing input signal, and then may be charged by a predetermined amount of charge. In this case, a sensing output signal that is different from the sensing input signal may be outputted. Through the sensing output signal generated as described above, contact information such as an existence of contact or a contact position may be determined.

The sensing wire 231 extends substantially in a first direction x, and connects the common electrode pad Cp and the touch driver 600 to transfer the sensing input signal or the sensing output signal. Hereinafter, the sensing input signal and the sensing output signal are referred to as sensing signals. The sensing wire 231 is disposed on a different layer from the common electrode pad Cp, and may be connected thereto through an opening 21. The sensing wire 231 may overlap a light blocking member 220 disposed between the first display panel and a second display panel 200. Each of the common electrode pads Cp may be connected to the touch driver 600 through different sensing wires 231.

In FIG. 3, sensing wires 231 are illustrated to extend to opposite ends of the first direction x, but the present inventive concept is not limited thereto, and as illustrated in FIG. 2, each of the sensing wires 231 may extend only from the touch driver 600 to the respective common electrode pad Cp in which the each of the sensing wires 231 is connected. In this case, when the plurality of common electrode pads Cp are arranged in a matrix form, a number of sensing wires 231 that overlap the common electrode pads Cp disposed at an end of each of rows A1, A2, A3, A4, A5, and A6 close to the touch driver 600 may be greater than or equal to a number of the common electrode pads Cp disposed in each of rows A1, A2, A3, A4, A5, and A6.

For example, a common electrode pad Cp disposed on a rightmost of the first row A1 (hereinafter also referred to as first common electrode pad) overlaps all of the sensing wires 231 connected to common electrode pads Cp disposed in the first row A1. The first common electrode pad is connected to one of the sensing wires of the sensing wires 231 (hereinafter also referred to as a first sensing wire) overlapping the first common electrode pad. The common electrode pad Cp adjacent to the first common electrode pad in the first direction x (hereinafter also referred to as a second common electrode pad) is connected to any one of the sensing wires (hereinafter also referred to as a second sensing wire) excluding the first sensing wire among the sensing wires 231 overlapping the first common electrode pad. In this case, the first common electrode pad overlaps the first sensing wire and the second sensing wire. The common electrode pad Cp disposed in the second row A2 adjacent to the first common electrode pad in the second direction y (hereinafter also referred to as a third common electrode pad) is connected to one of the sensing wires 231 (hereinafter also referred to as a third sensing wire). In this case, the third common electrode pad does not overlap the first sensing wire and the second sensing wire.

The touch driver 600 is connected with the common electrode pads Cp through the sensing wires 231 to transfer a sensing input signal to the common electrode pads Cp and receive a sensing output signal from the common electrode pads Cp. The touch driver 600 may process the sensing output signal to generate contact information such as an existence of contact and a contact position.

Figure 4:
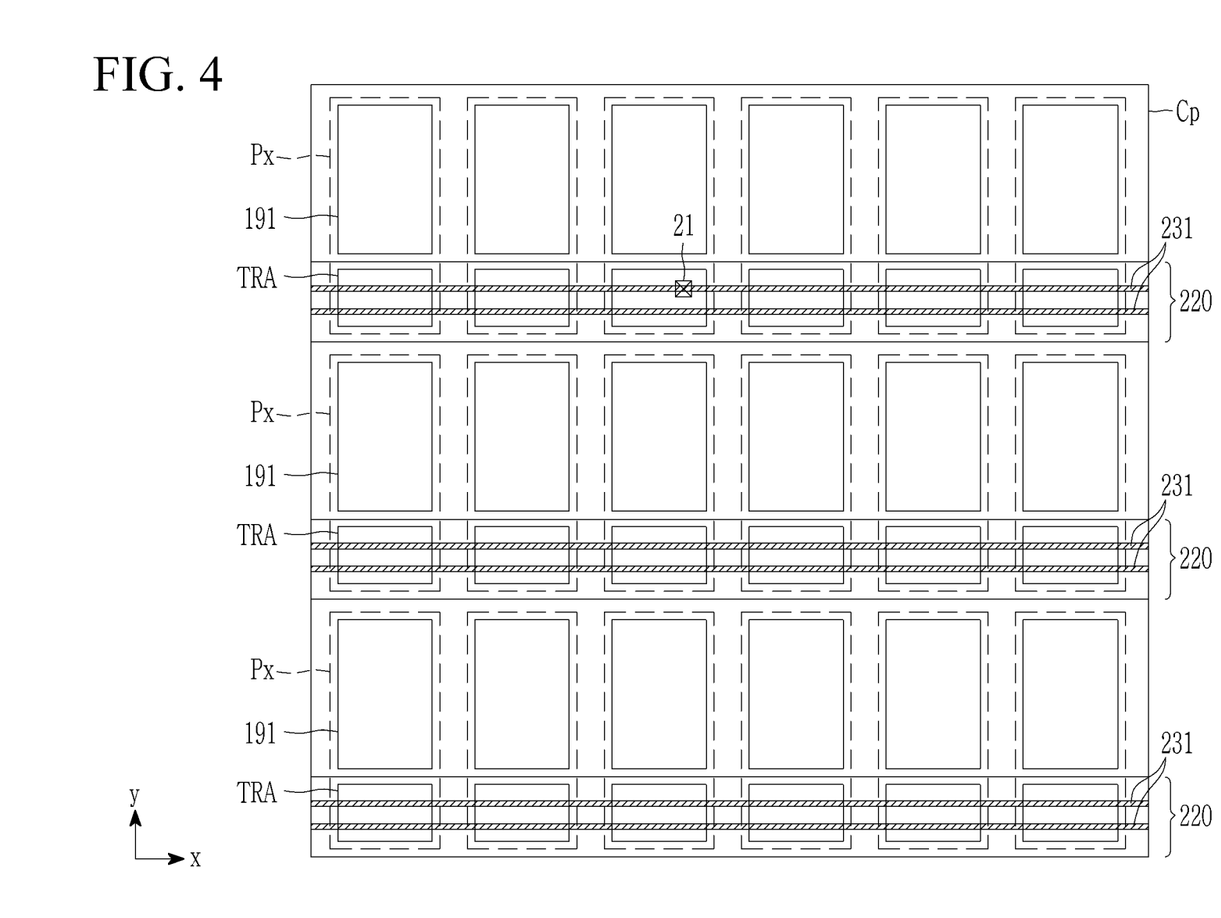
FIG. 4 illustrates a top plan view of one common electrode pad in a display device according to an exemplary embodiment.

FIG. 4 illustrates a top plan view of one common electrode pad in a display device according to an exemplary embodiment.

Each of the common electrode pads Cp may be disposed to correspond to a plurality of pixels PX. Each of the common electrode pads Cp may overlaps the plurality of pixels PX in a plan view. Each pixel PX includes a transistor circuit area TRA including at least one thin film transistor. The transistor circuit region TRA may include a thin film transistor connected with the data line 171, the gate line 121, and a part of the pixel electrode 191. The part of the pixel electrode 191 disposed in the transistor circuit area TRA may be for electrically connecting the pixel electrode 191 and the thin film transistor.

The light blocking member 220 overlaps the transistor circuit area TRA and extends in the first direction x. The light blocking member 220 is also called a black matrix and serves to prevent light leakage through the transistor circuit area TRA.

The sensing wires 231 overlap the light blocking member 220 and extend in the first direction x. Although the transistor circuit area TRA in each pixel row which extends in the first direction x is illustrated to overlap two sensing wires 231, the transistor circuit area TRA in each pixel row may overlap one sensing wire 231 or three or more sensing wires 231. The sensing wire 231 is connected to the common electrode pad Cp through the opening 21 formed in the transistor circuit area TRA in. In this case, each of the common electrode pads Cp is connected to respective one sensing wire 231. The opening 21 may overlap the light blocking member 220.

According to an exemplary embodiment, the flat panel display may include a plurality of common electrode pads CP which are disposed corresponding to a respective touch region, and thus may be touch-sensed without including a touch electrode layer. Thus, the thickness of the display device may be reduced while the touch sensing is possible. In addition, since the touch electrode layer does not need to be separately formed, the manufacturing process may be simplified. In addition, the sensing wire may overlap the light blocking member that prevents light leakage in the transistor circuit area and may not include a touch electrode layer, thereby improving transmittance of the display device.

Figure 5:
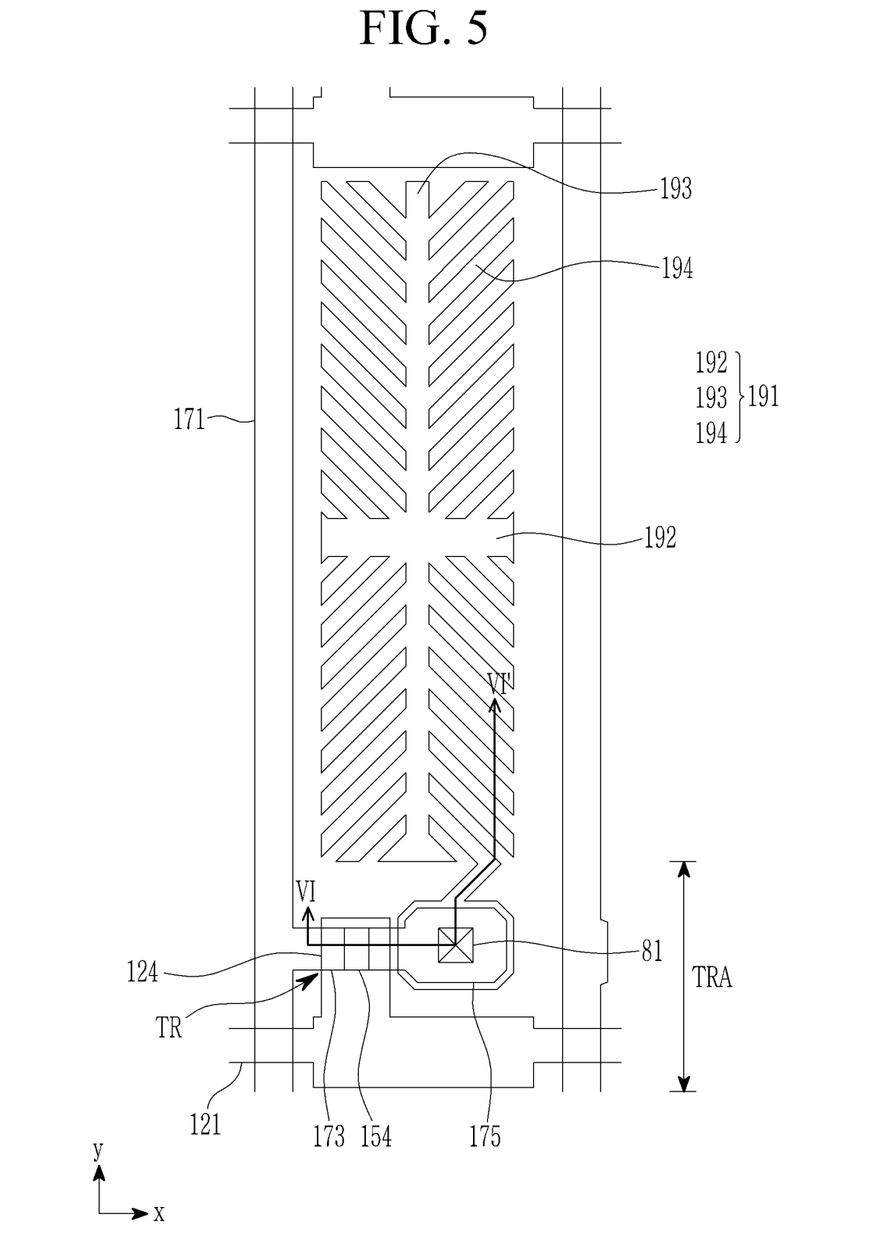
FIG. 5 illustrates a top plan view of a pixel of a flat panel display according to an exemplary embodiment.
Figure 6:
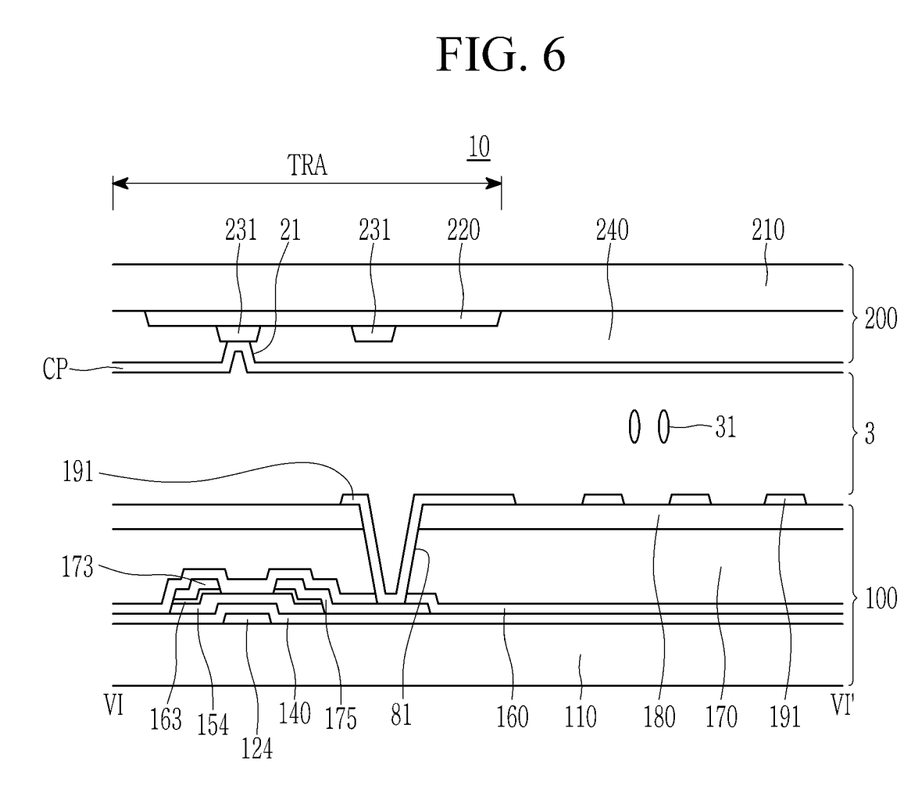
FIG. 6 illustrates a cross-sectional view taken along a line VI-VI' of FIG. 5.

Hereinafter, a flat panel display according to an embodiment will be described with reference to FIG. 5 and FIG. 6. FIG. 5 illustrates a top plan view of a pixel of an organic light emitting diode display according to an exemplary embodiment. In this case, illustration of the second display panel 200 is omitted in FIG. 5. FIG. 6 illustrates a cross-sectional view taken along a line VI-VI' of FIG. 5.

Referring to FIG. 5 and FIG. 6, the flat panel display 10 includes a first display panel 100, a second display panel 200, and a display element layer 3, for example, a liquid crystal layer, disposed between the two display panels 100 and 200.

The first display panel 100 includes a first substrate 110. A gate conductor including a gate line 121 and a gate electrode 124 is disposed on the first substrate 110. The gate electrode 124 may extend from the gate line 121 to protrude in one direction. The gate conductor may include a metal such as molybdenum, aluminum, silver, copper, chromium, tantalum, titanium, or an alloy thereof.

A gate insulating layer 140 is disposed on the gate conductor. A semiconductor layer 154 is disposed on the gate insulating layer 140. The semiconductor layer 154 may include amorphous silicon, poly silicon, an oxide semiconductor, and the like.

A data conductor including a data line 171, a source electrode 173, and a drain electrode 175 is disposed on the semiconductor layer 154. An ohmic contact layer 163 may be disposed between the semiconductor layer 154 and the data conductor which includes the data line 171, the source electrode 173 and the drain electrode 175. The data conductor may include a metal such as molybdenum, chromium, copper, aluminum, tantalum, titanium, or an alloy thereof.

The gate electrode 124, the source electrode 173, and the drain electrode 175 may form a thin film transistor (TFT) together with the semiconductor layer 154. A channel of the thin film transistor may be positioned in the semiconductor layer 154 between the source electrode 173 and the drain electrode 175.

A first insulating layer 160 is disposed on the gate insulating layer 140, the source electrode 173, and the drain electrode 175.

A color filter 170 may be disposed on the first insulating layer 160. The color filter 170 may include a red color filter, a green color filter, and a blue color filter.

An organic insulator 180 may be disposed on the color filter 170. An opening 81 exposing the drain electrode 175 is formed in the first insulating layer 160, the color filter 170, and the organic insulating layer 180.

A pixel electrode 191 is disposed on the organic insulator 180. The pixel electrode 191 is connected to the drain electrode 175 through the opening 81. The pixel electrode 191 may include a horizontal stem 192, a vertical stem 193, and a minute branch 194. The pixel electrode 191 may include a transparent conductive material such as ITO and IZO.

When the transistor TR is turned on by the gate-on voltage applied through the gate line 121, the pixel electrode 191 may receive a data voltage applied through the data line 171 to charge a capacitor formed by the pixel electrode 191, the common electrode pad Cp and a liquid crystal layer disposed between the pixel electrode 191 and the common electrode pad Cp with the data voltage.

Hereinafter, the second display panel 200 will be described.

The second display panel 200 includes a second substrate 210.

The light blocking member 220 is disposed below the second substrate 210. The light blocking member 220 may overlap a transistor of the first display panel 100.

The sensing wires 231 are disposed below the light blocking member 220. The sensing wires 231 overlap the light blocking member 220.

A second insulating layer 240 is disposed below the sensing wires 231. The second insulating layer 240 includes an opening 21 exposing the sensing wire 231.

A common electrode pad Cp is disposed below the second insulating layer 240. The common electrode pad Cp is connected to a common voltage line to receive a common voltage. In addition, the common electrode pad Cp may also be connected to the sensing wire 231 through the opening 21 to receive a sensing signal. The common electrode pad Cp may include a transparent conductive material such as ITO and IZO.

A liquid crystal layer 3 is disposed between the first display panel 100 and the second display panel 200. The liquid crystal layer 3 includes liquid crystal molecules 31. The liquid crystal molecules 31 may be aligned by an electric field generated by a voltage applied to the pixel electrode 191 and the common electrode pad Cp, and thus, gray levels may be expressed by adjusting polarization of incident light. The liquid crystal molecules 31 may have negative dielectric anisotropy, and may be aligned such that their major axes are inclined perpendicularly or are perpendicular to a plane of the first substrate 110 in the absence of an electric field in the liquid crystal layer 3.

An alignment layer (not illustrated) may be disposed between the pixel electrode 191 and the liquid crystal layer 3 and between the common electrode pad Cp and the liquid crystal layer 3.

Figure 7:
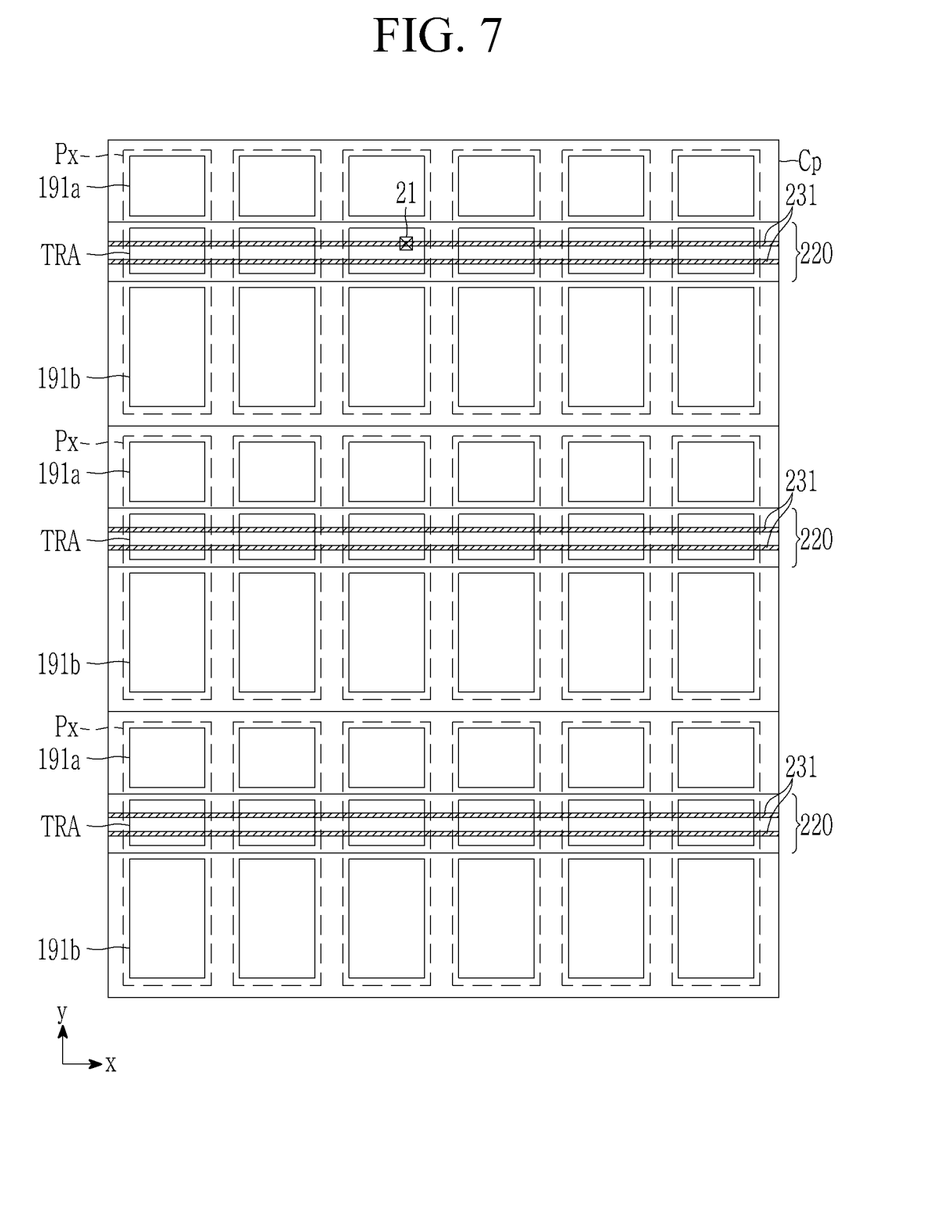
FIG. 7 illustrates a top plan view of one common electrode pad in a display device according to an exemplary embodiment.

Hereinafter, a common electrode pad Cp of the display device according to an exemplary embodiment will be described with reference to FIG. 7. FIG. 7 illustrates a top plan view of one common electrode pad in a display device according to an exemplary embodiment.

The pixel PX may include a first subpixel electrode 191a and a second subpixel electrode 191b to which different voltage is applied to improve side visibility, and may further include a transistor circuit area TRA positioned between the first subpixel electrode 191a and the second subpixel electrode 191b. The transistor circuit area TRA may include a thin film transistor connected to the data line 171, the first subpixel electrode 191a, and/or the second subpixel electrode 191b.

The light blocking member 220 overlaps the transistor circuit area TRA, and extends in the first direction x between the first subpixel electrode 191a and the second subpixel electrode 191b.

The sensing wire 231 overlaps the light blocking member 220 and extends in the first direction x between the first subpixel electrode 191a and the second subpixel electrode 191b. Although each pixel row listed in the first direction x is illustrated to overlap two sensing wires 231, each pixel row may overlap one sensing wire 231 or three or more sensing wires 231. The sensing wire 231 is connected to the common electrode pad Cp through the opening 21. In this case, the common electrode pad Cp is connected to one sensing wire 231. The opening 21 may overlap the light blocking member 220.

While this disclosure has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A flat panel display comprising:
a first display panel and a second display panel facing each other; and
a display element disposed between the first display panel and the second display panel,
wherein the second display panel includes:
a common electrode configured to transfer a common voltage and including a plurality of common electrode pads;
a light blocking member; and
a plurality of sensing wires connected to the common electrode to transfer a sensing signal,
wherein the plurality of sensing wires overlap the light blocking member,
the common electrode includes a first common electrode pad and a second common electrode pad that are adjacent in a first direction,
the sensing wires include a first sensing wire that is connected to the first common electrode pad and a second sensing wire that is connected to the second common electrode pad, and
the first common electrode pad overlaps the first sensing wire and the second sensing wire.

2. The flat panel display of claim 1, wherein
the first display panel includes a first substrate, a gate line extending in the first direction, a thin film transistor, and a pixel electrode, and
the light blocking member and the plurality of sensing wires extend in the first direction.

3. The flat panel display of claim 2, wherein
the second display panel further includes a second substrate and an insulating layer on the second substrate,
the insulating layer is disposed between the plurality of sensing wires and the plurality of common electrode pads, and
the plurality of common electrode pads are connected to the plurality of sensing wires through an opening of the insulating layer exposing the plurality of sensing wires.

4. The flat panel display of claim 3, wherein
each of the plurality of common electrode pads is connected to at least one of the plurality of sensing wires.

5. The flat panel display of claim 4, wherein
the light blocking member overlaps the thin film transistor.

6. The flat panel display of claim 5, wherein
the plurality of common electrode pads are arranged in a matrix form, and
each of the plurality of common electrode pads is connected to different sensing wires among the plurality of sensing wires.

7. The flat panel display of claim 6, wherein
the plurality of common electrode pads are spaced apart from each other.

8. The flat panel display of claim 7, wherein
the plurality of common electrode pads are disposed in a same layer.

9. The flat panel display of claim 8, further comprising a touch driver,
wherein the touch driver is connected to each of the plurality of common electrode pads.

10. The flat panel display of claim 9, wherein
the display element includes liquid crystal molecules having negative dielectric anisotropy.

11. The flat panel display of claim 2, wherein
the pixel electrode includes a first subpixel electrode and a second subpixel electrode, and
the thin film transistor is disposed between the first subpixel electrode and the second subpixel electrode.

12. The flat panel display of claim 11, wherein
the plurality of sensing wires extend in the first direction between the first subpixel electrode and the second subpixel electrode.

13. The flat panel display of claim 12, wherein
the thin film transistor includes a gate electrode extending from the gate line, a semiconductor layer, a source electrode, and a drain electrode.

14. A flat panel display comprising:
a first substrate;
a gate line disposed on the first substrate to extend in a first direction;
a second substrate facing the first substrate;
a light blocking member disposed on the second substrate;
a sensing wire extending in the first direction and disposed on the light blocking member to transfer a sensing signal;
an insulating layer disposed on the light blocking member and the sensing wire to include an opening exposing the sensing wire; and
a common electrode disposed on the insulating layer to transfer a common voltage,
wherein the sensing wire is connected to the common electrode in the opening of the insulating layer,
the opening overlaps the light blocking member,
the common electrode includes a first common electrode pad and a second common electrode pad that are adjacent in the first direction,
the sensing wire includes a first sensing wire that is connected to the first common electrode pad and a second sensing wire that is connected to the second common electrode pad, and
the first common electrode pad overlaps the first sensing wire and the second sensing wire.

15. The flat panel display of claim 14, wherein
the light blocking member extends in the first direction.

16. The flat panel display of claim 15, further comprising
a thin film transistor and a pixel electrode disposed on the first substrate,
wherein the light blocking member overlaps the thin film transistor.

17. The flat panel display of claim 16, wherein
the common electrode further includes a third common electrode pad that is adjacent to the first common electrode pad in a second direction crossing the first direction,
the sensing wire further includes a third sensing wire that is connected to the third common electrode pad, and
the third common electrode pad does not overlap the first sensing wire and the second sensing wire.

18. The flat panel display of claim 17, wherein
the first common electrode pad, the second common electrode pad, and the third common electrode pad are disposed on a same layer and spaced apart from each other.

19. The flat panel display of claim 18, further comprising
a liquid crystal layer disposed between the pixel electrode and the common electrode,
wherein the liquid crystal layer includes liquid crystal molecules having negative dielectric anisotropy.

* * * * *